United States Patent Office 2,854,831
Patented Oct. 7, 1958

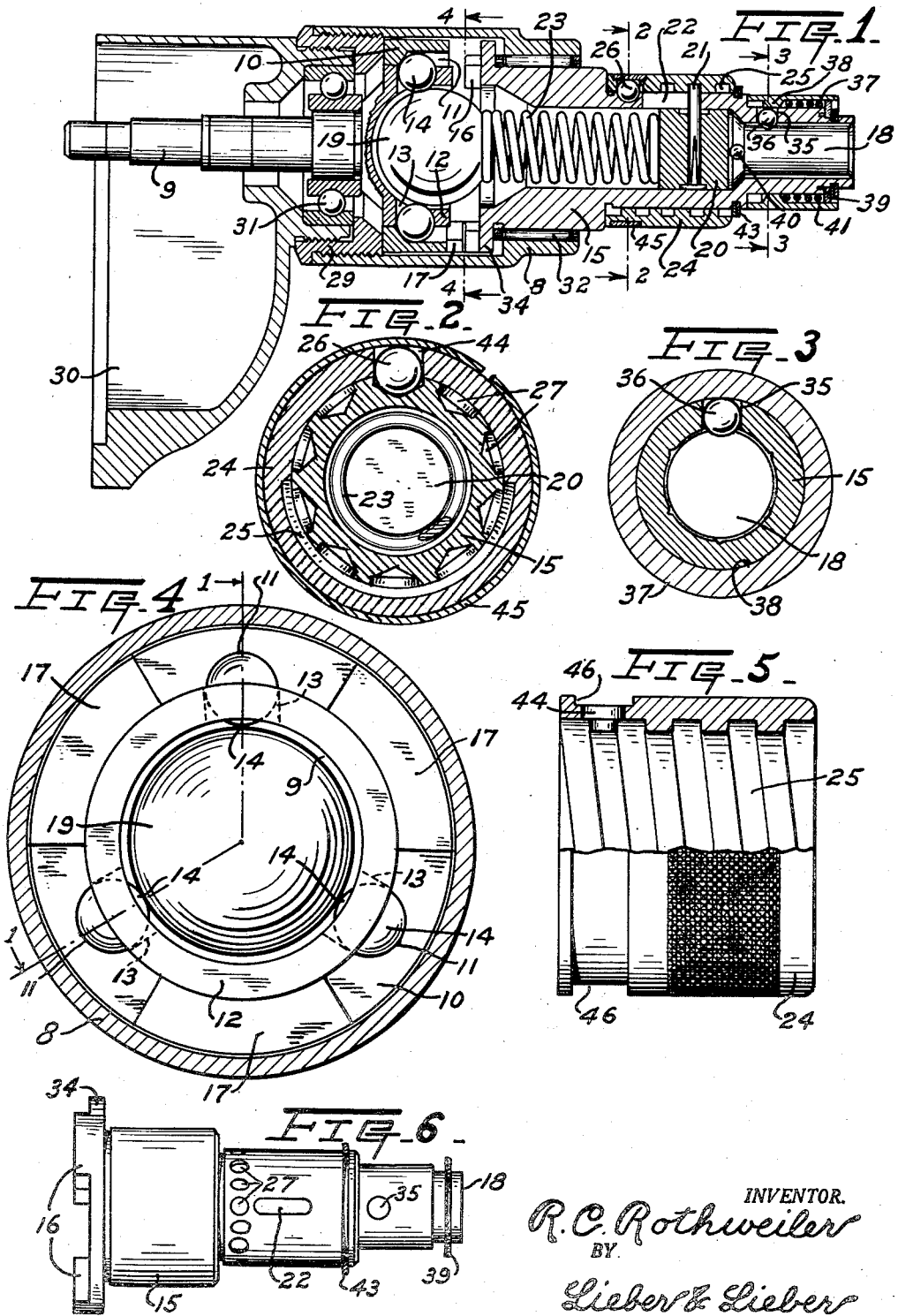

2,854,831

TORQUE ADJUSTMENT FOR POWER DRIVEN TOOLS

Richard C. Rothweiler, Wauwatosa, Wis., assignor to Milwaukee Electric Tool Corporation, Milwaukee, Wis., a corporation of Wisconsin Application September 11, 1956, Serial No. 609,264

8 Claims. (Cl. 64—29)

The present invention relates in general to improvements in the art of propelling work performing implements, and relates more specifically to improvements in the construction and operation of torque adjusters for power driven rotary tools such as screw drivers or the like.

The primary object of this invention is to provide an improved torque adjusting assemblage for power driven screw drivers or the like, which is conveniently manipulable without removing the driven tool from its driving member.

As shown in United States Patent No. 2,475,518, granted July 5, 1949, it has heretofore been common practice in the production of portable power driven tool propelling units for rotating screw-drivers, drills and the like, to provide a clutch between the propelling motor and the tool confining socket adapted to automatically interrupt the drive upon being subjected to excessive torque as when the driven implement encountered an abnormal obstruction or became otherwise excessively overloaded. One highly satisfactory type of clutch at present utilized in such portable tool driving units and which is shown in the above patent, comprises a motor driven implement propelling spindle having an annular end flange provided with radial openings and which is confined within an annular clutch driving element provided with sockets alineable with the spindle openings, a small ball cooperable with each set of the spindle openings and with the adjacent driving element sockets, a large ball coacting with the small balls to normally maintain a driving connection between the spindle and the driving element of the clutch, an elongated clutch driven element disposed in axial alinement with the driving element and having an implement receiving socket at its end remote from the large ball, a compression spring interposed between the driven element and the large ball, and means accessible only through the socket and upon removal of the implement for varying the tension of the spring so as to cause the large ball to be moved toward the socket by inward displacement of the small balls out of the spindle sockets whenever the driving torque reached a predetermined high value.

While this type of automatically releasable torque controlled clutch mechanism when properly constructed functioned quite well, it was highly objectionable in normal use especially when rapid and accurate variation of the torque was desirable, as when driving screws and causing the drive to be automatically interrupted whenever a screw has been driven home. The prior torque varying mechanisms not only necessitated removal of the implement from the driving socket whenever an adjustment was to be made, but they were also difficult to accurately adjust and frequently required several such tool removals in order to effect a proper adjustment. Then too, these previous mechanisms were relatively complicated and the adjustments had to be effected with a special device such as a screw driver which often became mislaid thus resulting in loss of time and further annoyance.

It is therefore an important object of the present invention to provide an improved torque adjuster especially applicable to such portable power tools, and which obviates all of the abovementioned objectionable features.

Another important object of this invention is to provide a simple and compact torque adjusting assemblage which can be quickly manipulated to accurately pre-set the drive releasing pressure to any desired value, without the aid of separate manipulating devices.

A further important object of the invention is to provide a torque adjusting device especially applicable to screw driving units, and wherein the torque for safely driving screws of different sizes can be predetermined with utmost precision and with minimum effort.

Still another important object of my invention is to provide improved automatically releasable tool driving mechanism which can be quickly and conveniently adjusted to vary its functioning so as to meet varying conditions of use.

These and other more specific objects and advantages of the invention will be apparent from the following detailed description.

A clear conception of the features constituting the present improvements, and of the construction and operation of a power drive for portable tool units embodying the invention, may be had by referring to the drawing accompanying and forming a part of this specification wherein like reference characters designate the same or similar parts in the various views.

Fig. 1 is a longitudinal section through the clutch and power delivery end of a portable rotary implement driving unit, showing that portion of the mechanism from the driving spindle to the implement confining socket, the section being taken along the irregular line 1—1 of Fig. 4;

Fig. 2 is an enlarged transverse vertical section through the torque adjusting portion of the assemblage of Fig. 1, taken along the line 2—2;

Fig. 3 is a likewise enlarged transverse vertical section through the implement confining socket portion of the same assemblage, taken along the line 3—3 of Fig. 1;

Fig. 4 is a similarly enlarged transverse vertical section through the clutch portion of the assemblage of Fig. 1, taken along the line 4—4;

Fig. 5 is a likewise enlarged part sectional side elevation of the torque adjusting collar of the same assemblage, the section having been taken as in Fig. 1; and Fig. 6 is a top view of the driven clutch and implement receiving socket element of the same unit, drawn to the same scale as Fig. 1.

While the invention has been shown and described herein as being especially and advantageously applicable to power driven portable screw drivers, it is not the intent to restrict the use of the improved features to such implements; and it is also contemplated that specific descriptive terms be given the broadest possible interpretation consistent with the disclosure.

Referring to the drawing, the improved screw driver propelling and torque adjusting mechanism, shown therein, comprises in general a housing 8; a motor driven propelling spindle 9 at one end of the housing 8 and having an annular flange 12 formed integral therewith and provided with three radial openings 13; an annular clutch driving element 10 surrounding the spindle flange 12 and having therein three internal sockets 11 alineable with the openings 13; a small driving member or ball 14 engageable with each socket 11 and with the alined opening 13; an elongated hollow clutch driven element 15 journalled in the housing 8 and having three end lugs 16 at one end inter-engageable with three similar lugs 17 at the adjacent end of the element 10, and being provided at its opposite end with an implement receiving socket 18; a large torque control ball 19 confined within the spindle flange 12 and coacting with the inner peripheral portions of the small balls 14; a slide 20 movable within the hollow clutch element 15 and having a pin 21 projecting outwardly through a slot 22 in the driven element 15; a helical compression spring 23 interposed between the slide 20 and the large ball 19; a collar 24 rotatably embracing the elongated element 15 and having an internal cam or screw thread 25 coacting with the outer end of the pin 21; and a latch ball 26 mounted in the collar 23 and being cooperable with any of a series of external notches 27 formed in the periphery of the rotary clutch element 15.

The housing 8 is tubular in shape and has its rear end portion secured by means of an annular adapter ring 29 to the front end of a casing 30 which normally encloses the speed reduction gearing associated with the propelling motor of the unit, and which also carries an anti-friction bearing 31 for the shaft of the spindle 9, see Fig. 1. The rear end of the clutch element 10 bears against the front end surface of the adapter ring 29, and the front end portion of the housing 8 is provided with an anti-friction bearing 32 in which the rotary tool actuating element 15 is journalled and is also axially slidable to permit inter-engagement of the clutch jaws or lugs 16, 17. The housing 8 and casing 30 provide means for holding and for manipulating the portable tool unit, and for concealing the clutch elements, and the adapter ring 29 and bearing 31 also constitute a thrust bearing assemblage for the element 10 and spindle 9. The sockets 11 in the clutch element 10 are semi-cylindrical as shown in Fig. 4, and the radial openings in the spindle flange 12 are cylindrical, so that the small balls 14 are adapted to snugly engage these sockets and openings.

The elongated hollow driven element 15 of the clutch is of integral construction and has three successive sections of diminishing diameter approaching its end socket 18, and the element end portion of largest diameter is journalled in the bearing 32 and has an integral flange 34 which carries the lugs 16, see Figs. 1 and 6. The opposite end portion of the clutch element 15 in which the implement confining socket 18 is located, is provided with a radial hole 35 within which a latch ball 36 is confined, and is also embraced by a bit retaining sleeve 37 slidable along the socketed end portion and having an internal ridge 38 for pushing the ball 36 inwardly to lockingly engage the shank of an implement applied to the socket 18, see Figs. 1 and 3. The extreme end of the socketed tool receiving portion of the element 15 is also provided with a retainer ring 39 and a helical spring 41 is interposed between this ring 39 and the sleeve ridge 38 and constantly urges the sleeve 37 toward the ball 36 so as to hold the latter in latching position. The inner end of the socket 18 is spanned by a stop pin 40 for the shank of the applied implement, and this pin 40 also serves as a stop for the forward movement of the slide 20.

The interior of the unitary clutch element 15 is provided with a cylindrical bore along which the slide 20 is movable, and the slot 22 through which the pin 21 projects is disposed radially of this bore. The helical compression spring 23 has flat opposite end loops one of which engages the rear face of the slide 20, while the other engages the large ball 19 and constantly urges this ball into engagement with the three small balls 14 confined within the spindle openings 13 and thereby tends to constantly urge the balls 14 into driving engagement with the sockets 11 of the driving element 10. The internally threaded spring tension adjusting collar 24 surrounds and is rotatable about the medial portion of the element 15 between the end portions of largest and smallest diameters and is prevented from moving axially by a snap ring 43 as shown in Figs. 1 and 6. The latch ball 26 which is cooperable with the notches 27 of the element 15, is confined within an opening 44 in the collar 24 by an annular spring 45 fitting an annular groove 46 in this collar, and which constantly resiliently urges the ball 26 inwardly, see Figs. 1, 2 and 5.

When the improved portable power actuated implement driving unit has been properly constructed, assembled and applied to a propelling motor, a suitable tool or implement such as a screw driver, may be firmly attached within the socket 18 with the aid of the spring pressed sleeve 37 and latch ball 36, in axial alinement with the elements 10, 15 in an obvious manner, whereupon the attached implement may be driven by operation of the propelling motor associated with the casing 30 after having been applied to the work. When no axial pressure is being applied to the implement, the various parts of the unit will be in the position illustrated in Fig. 1, with the clutch lugs 16, 17 out of driving engagement, and the implement and its carrying element 15 will not rotate. However, when the implement is actually applied to the work and is subjected to axial pressure, the spring 23 is compressed sufficiently to cause the jaws or lugs 16, 17 to interlock and to simultaneously cause the large ball 19 to force the smaller balls 14 into the driving sockets 11 of the driving element 10, thereby transmitting normal rotary driving motion to the implement.

This normal rotation of the implement will continue until the torque imposed thereon is materially increased, as when the implement is a screw driver and the work is a screw which has been driven home, whereupon the cup-shaped sockets 11 coacting with the small balls 14 will force these balls inwardly out of these sockets and will thus interrupt the drive through the small balls 14 but will not cause the lugs 16, 17 to become disengaged while forward pressure continues to be applied. However, if the implement is thereafter removed from the work, the jaw lugs 16, 17 will automatically become disengaged and the small balls 14 will again be forced outwardly into the sockets 11 of the element 10 by the spring 23 coacting with the large ball 19, as in Fig. 1, but the clutch element 15 and the implement will not rotate with the ball parts thus restored to active position unil axial pressure is applied to the driven element. The improved unit thus functions to automatically disconnect the driven tool or implement from the power source whenever the implement is subjected to a predetermined abnormal degree of torque.

In order to vary magnitude of the torque at which the applied power is thus automatically disconnected, it is only necessary to rotate the adjusting collar 24 about the driven clutch element 15 in either direction, dependent upon whether increased or diminished torque is required. When this collar 24 is thus manipulated, the pin 21 which is secured to the slide 20, will ride along the cam surfaces of the screw thread 25 and will cause the slide 20 to either compress or de-compress the spring 23 more or less depending upon the direction of rotation of the collar 24. During such rotation the annular ball retaining spring 45 will permit the latch ball 26 to ride over the successive notches 27 in the element 15, until the desired degree of spring tension adjustment has been effected, whereupon the spring 45 will again force the latch ball 26 into an adjacent notch 27 and will thus retain the parts in adjusted condition. This manipulation of the adjusting collar can be quickly and conveniently effected from the exterior of the unit and without removing the tool or implement from the socket 18, and results in accurately predetermining the torque at which the device will function to automatically release the driving power.

From the foregoing detailed description of the construction and operation of the commercial unit, it will be apparent that the invention in fact provides an improved torque adjustment for rotary power driven tools or implements, which is simple and compact in structure and highly effective in use. All movable parts which do not have smooth annular exposed external surfaces, are well concealed so as to avoid exposing the user of the portable unit to possible injury, and whenever the assemblage is not in use the implement is automatically arrested but it may be quickly connected to the power source by merely subjecting the same to axial pressure. The degree of torque increase required to automatically disconnect the power, may be varied with utmost precision without the use of separate tools and without disturbing the attached implement, and the adjusting device is also of sturdy construction and manipulable with minimum effort due to the relatively large external diameter of the adjustable collar 24 and the exterior knurling thereof as shown in Fig. 5. The improved assemblage has gone into highly satisfactory and successful use, and may be applied to various types and sizes of power driven tool units at very moderate cost.

It should be understood that it is not desired to limit this invention to the exact details of construction and operation of the torque adjuster herein specifically shown and described, for various modifications within the scope of the appended claims may occur to persons skilled in the art.

I claim:

1. In a torque adjuster for rotary implements, a housing, a rotary propelling spindle, a clutch having inter-engageable rotary driving and driven elements confined within said housing, said driving element having a socket therein adjacent to said spindle, a ball member engageable with said socket and coacting with said spindle to drivingly interconnect the spindle with the driving element, a ball movable axially of said elements to move said ball member into active driving position, an implement receiving socket in said driven element remote from said ball, a slide movable along and within said driven element and having a projection extending outwardly through the element, a compression spring interposed between said ball and said slide, a collar embracing said driven element and having internal screw-threads coacting with said projection to vary the tension of said spring when the collar is rotated, and a latch for holding said collar in various rotative positions.

2. In a torque adjuster for rotary implements, a housing, a rotary propelling spindle, a clutch within said housing having driving and driven elements provided with inter-engageable motion transmitting lugs, said driving element having several sockets therein and said spindle having openings alineable with said sockets, a ball member coacting with each of said openings and being engageable with an adjacent socket to drivingly interconnect said spindle and said driving element, a ball movable axially of said elements to move said ball members into said sockets, an implement receiving socket in said driven element remote from said ball, a slide movable along and within said driven element, a compression spring interposed between said ball and said slide, an internally screw-threaded collar embracing said driven element, a pin carried by said slide and coacting with the screw threads of said sleeve to vary the tension of said spring when said collar is rotated, and a latch for holding said collar in various rotative positions.

3. In a torque adjuster for rotary implements, a housing, a rotary clutch having inter-engageable driving and driven elements disposed within said housing, said driving element having spaced sockets therein, a rotary spindle having a flange confined within said driving element and provided with spaced internal openings alineable with said sockets, a small ball engageable with each of said openings and coacting with an alined socket to rotate the driving element, a large ball movable axially of said elements to move said small balls into active driving position, an implement receiving socket at the end of said driven element remote from said balls, a slide movable along said driven element and having an outward projection thereon, a compression spring interposed between said slide and said large ball, a collar adjustably embracing said driven element and having a cam surface coacting with said slide projection to move said slide and to thereby vary the tension of said spring, and means for holding said collar in various positions of adjustment.

4. In a torque adjuster for rotary implements, a housing, a rotary clutch having positively inter-engageable driving and driven elements disposed within said housing, said driving element having circumferentially spaced inner sockets therein, a rotary spindle having an annular flange confined within said driving element and provided with spaced radial openings alineable with said sockets, a small ball engageable with each of said alined openings and sockets, a large ball movable axially of said elements to move said small balls into active driving position within said sockets, an implement receiving socket at the outer end of said driven element, a slide movable within said driven element and having an outward projection thereon, a compression spring interposed between said slide and said large ball, a collar adjustably embracing said driven element and having a cam surface coacting with said slide projection to move said slide and to thereby vary the tension of said spring, and a ball latch for holding said collar in various positions of adjustment.

5. In a torque adjuster for rotary implements, a housing, a rotary clutch having driving and driven elements disposed within said housing, said elements having inter-engageable jaws and said driving element having spaced sockets therein, a rotary spindle provided with openings alineable with said sockets, a small ball engageable with each of said sockets and an adjacent opening, a large ball movable axially of said elements to move said small balls into active driving position, a slide movable along said driven element and having an outward projection thereon, a compression spring interposed between said slide and said large ball, a collar adjustably embracing the exterior of said driven element and having a screw thread coacting with said slide projection to move said slide and to thereby vary the tension of said spring, and means for holding said collar in various positions of adjustment.

6. In a torque adjuster for rotary implements, a rotary clutch having inter-engageable driving and driven elements the former of which is provided with several sockets, a rotary spindle having openings alineable with said sockets, a small ball engageable with each of said sockets and the alined openings, a large ball movable axially of said elements to move said small balls into active driving position, a slide movable along said driven element and having an outward projection thereon, a compression spring interposed between said slide and said large ball, a collar adjustably embracing the exterior of said driven element and having a cam surface coacting with said slide projection to move said slide and to thereby vary the tension of said spring, and means for holding said collar in various positions of adjustment.

7. In a torque adjuster for rotary implements, a rotary clutch having positively inter-engageable driving and driven elements, resilient means confined within said driven element for disconnecting the elements when not subjected to axial pressure, means associated with said driving element for automatically interrupting the delivery of power of said driven element when the latter is subjected to predetermined driving torque, an implement mounting socket at the end of said driven element remote from said driving element, a slide coacting with said resilient means within said driven element, and means manipulable from the exterior of said elements and being cooperable with said slide to vary the tension of said resilient means and the predetermined torque at which said automatic power interrupting means will act without removing the implement from said socket.

8. In a torque adjuster for rotary implements, a rotary clutch having positively inter-engageable driving and driven elements, a compression spring confined within said driven element for disconnecting the elements when not subjected to axial pressure, means associated with said driving element for automatically interrupting the delivery of power to said driven element when the latter is subjected to predetermined driving torque, an implement mounting socket at the end of said driven element remote from said driving element, a slide coacting with said spring within said driven element, a sleeve rotatable about the exterior of said driven element and having a cam surface cooperable with said slide to vary the tension of said spring and the predetermined torque at which said power interrupting means will act without removing the implement from said socket, and a latch for maintaining said sleeve in various positions of adjustment.

References Cited in the file of this patent

UNITED STATES PATENTS

| | | |
|---|---|---|
| 1,684,633 | Levedahl | Sept. 18, 1928 |
| 1,913,046 | Callan | June 6, 1933 |
| 2,127,855 | Baumgratz et al. | Aug. 23, 1938 |
| 2,475,518 | Ristow | July 5, 1949 |